United States Patent [19]

Meier et al.

[11] Patent Number: 5,569,066
[45] Date of Patent: Oct. 29, 1996

[54] DEVICE AS PART OF A SLAUGHTERING LINE

[75] Inventors: Ernst-August Meier, Bad Salzdetfurth; Stefan Schirmer, Hanover, both of Germany

[73] Assignee: Phoenix Aktiengesellschaft, Hamburg, Germany

[21] Appl. No.: 424,343

[22] PCT Filed: Aug. 23, 1994

[86] PCT No.: PCT/DE94/00962

§ 371 Date: Apr. 17, 1995

§ 102(e) Date: Apr. 17, 1995

[87] PCT Pub. No.: WO95/05745

PCT Pub. Date: Mar. 2, 1995

[30] Foreign Application Priority Data

Aug. 26, 1993 [DE] Germany ............ 43 28 738.7

[51] Int. Cl.⁶ ..................................... A22B 5/08
[52] U.S. Cl. ................... 452/93; 452/94; 452/97
[58] Field of Search ................... 452/93, 94, 95, 452/96, 97, 104

[56] References Cited

U.S. PATENT DOCUMENTS

| 15,318 | 3/1922 | Kersten . | |
|---|---|---|---|
| 1,460,863 | 7/1923 | Pratt | 452/97 |
| 1,502,749 | 7/1924 | Schmidt . | |
| 2,296,873 | 9/1942 | Rachford . | |
| 2,604,656 | 7/1952 | Anderson et al. . | |
| 4,570,297 | 2/1986 | Nijhuis | 452/97 |
| 4,907,317 | 3/1990 | Radovic et al. . | |
| 5,049,109 | 9/1991 | Radovic et al. | 452/94 |

FOREIGN PATENT DOCUMENTS

| 639936 | 4/1962 | Canada | 452/94 |
|---|---|---|---|
| 3138891 | 4/1983 | Germany . | |

*Primary Examiner*—Willis Little
*Attorney, Agent, or Firm*—Collard & Roe, P.C.

[57] ABSTRACT

The invention relates to a device as part of a slaughtering line, especially for slaughtering hogs, consisting of a depilation beater (1) made of elastomaric material and having a baffle stool (3); a screw-on zone made of metal; a stop, against which the depilation beater supports itself via the baffle stool (3) at extreme deformation; as well as of angle-shaped scrapers made of metal, the latter being arranged on the working side of the depilation beater. The essence of the invention consists in that at least one fluted groove (23, 24, 25, 26) extending in the transverse direction is present within the zone of the beginning (4) of the baffle stool.

6 Claims, 2 Drawing Sheets

DEVICE AS PART OF A SLAUGHTERING LINE

SPECIFICATION

The invention relates to a depilation device as part of a slaughtering line, especially for the slaughtering of hogs, consisting of a depilation beater consisting of elastomeric material with preferably embedded strength carriers, said beater substantially being a rectangular basic body, with a starting zone A, an end zone B, and a center zone C, whereby the starting zone A is thicker than the end zone B, and additionally, bores are present within zones A and B; a screw-on zone made of metal, to which the thicker zone A of the basic body is screwed, whereby the depilation beater is rigidly joined by means of the bores and a screw-bolt system, as well as by a clamping plate; a stop, against which the depilation beater supports itself via the baffle stool at extreme deformation; as well as of angle-shaped scrapers made of metal, which are arranged on the front side (working side) of the depilation beater within zone B whereby a solid anchoring is accomplished by means of the bores and a rivet joint (U.S. Pat. No. 2,604,656).

A device is also known from US-A-15 318 (FIGS. 1 to 3), in which the depilation beater has, on the front side (working side) where the scrapers are located, a belly-shaped elevation, namely within the zone of the stop present on the back side. Said elevation is fitted with hollow chambers extending in the cross direction of the beater, and/or with slots arranged in the longitudinal direction of the beater. Said hollow chambers or slots are intended to facilitate the bending deformation. It is a drawback here that the weakening of the material caused by the hollow chambers or slots leads, at extreme bending deformation, to the formation of cracks on both sides, thus rendering the depilation beater unusable, which is illustrated particularly by FIG. 3 of US-A-15 318.

In the meantime, a change has been made in that the basic body of the depilation beater is designed in such a way that its starting zone A is thicker than its end zone B, whereby reference is made to U.S. Pat. No. 4,907,317 (FIG. 1) with respect to said basic concept. In this connection, longitudinally and diagonally extending reinforcing ribs are arranged on the working side, where the scrapers are located, namely in the center zone C.

With the devices shown in the three aforementioned published references, which describe the ready-for-operation condition, the depilation beater, however, does not have any baffle stool, whose presence is of important significance within the framework of the device according to the invention.

Now, the object of the invention is to make available a baffle stool that it not subject to any wear (e.g. formation of cracks) even at extreme bending deformation.

This object is achieved by a depilation device in that at least one fluted groove extending in the transverse direction is present within the zone of the beginning of the baffle stool.

Usefully, the baffle stool has a plurality of fluted grooves, particularly two to five fluted grooves. Furthermore, it is advantageous in this connection if the fluted grooves have a varying depth and/or width, whereby the depth and the width increases toward the end of the baffle stool.

The invention is now explained on an exemplified embodiment by reference to the schematic drawings, in which.

Figure 1:
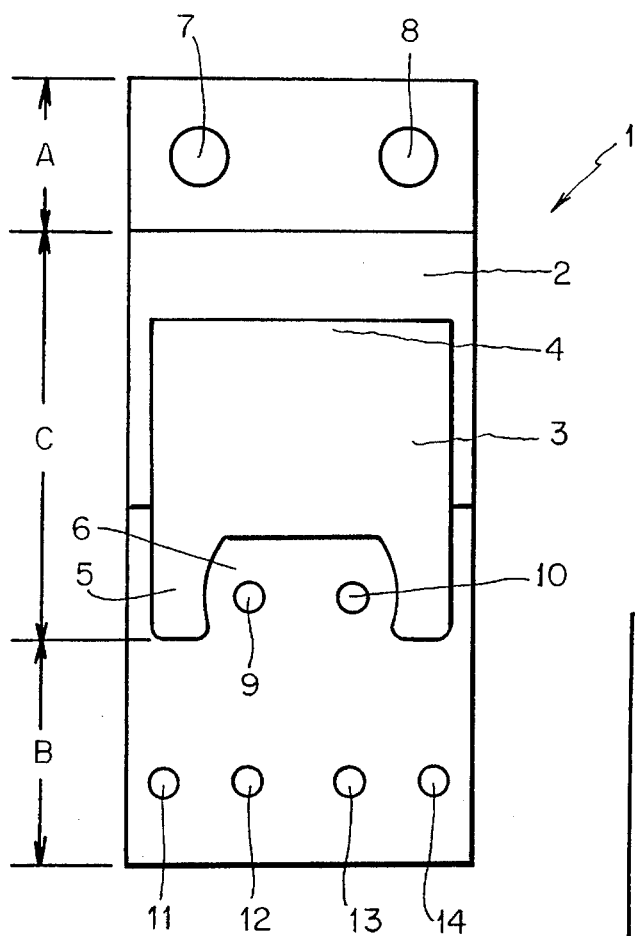
FIG. 1 shows the back side of the depilation beater with the integrated baffle stool.

FIG. 1 shows a depilation beater (1) made of elastomeric material (rubber or rubber-like material) with embedded strength carriers, said beater being a substantially rectangular basic body (2) with the zones A (starting zone), B (end zone) and C (center zone). On its back side (shown here), the depilation beater has, within zone C, a baffle stool (3), which is designed as one piece with the basic body (2) as an understructure, and which has a thickness of 7 to 10 mm, whereby the zone of the end (5) of the baffle stool has a recess (6). The zone within the range of the beginning (4) of the baffle stool, which zone is particularly susceptible to wear, is explained hereinafter in greater detail in connection with FIGS. 3 and 4. Two bores (7, 8) for screwing the depilation beater together within the screw-on zone—FIG. 3—are present in the zones A and B, as well as in the zone of the recess (6); and six bores (9 to 14) for mounting the scrapers are present in said zones—FIGS. 2 and 3.

Figure 2:
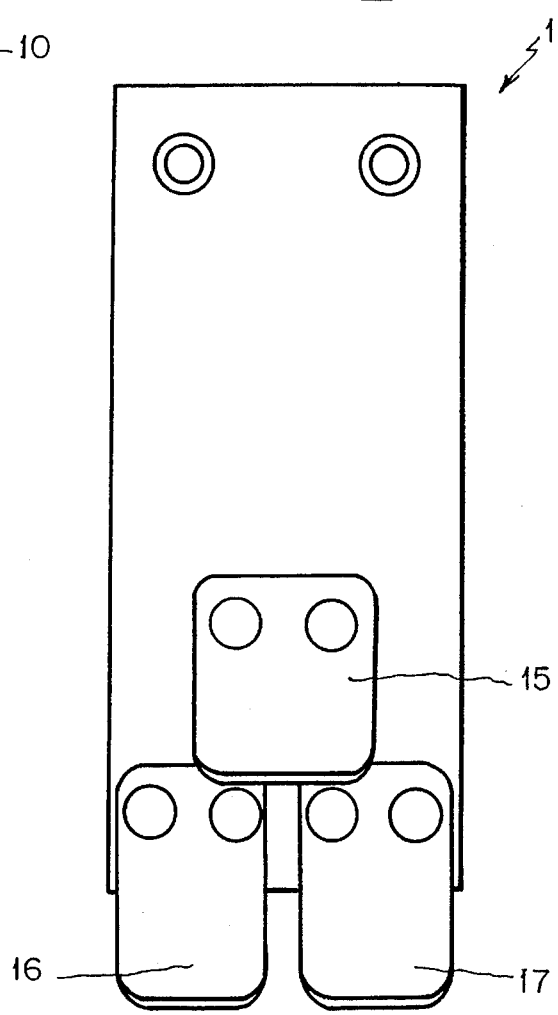
FIG. 2 shows the front side of the depilation beater with scrapers arranged whereon.

FIG. 2 shows the front side of the depilation beater (1) with three integrated scrapers (15, 16, 17).

Figure 3:
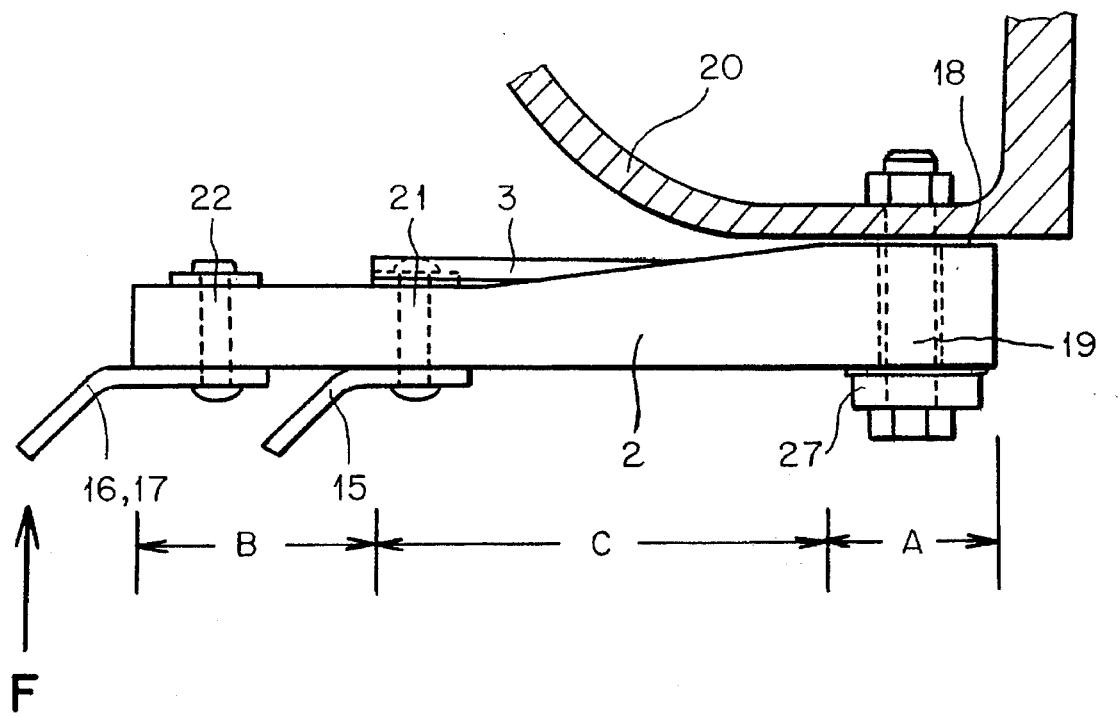
FIG. 3 shows a lateral view of the device ready for operation.

Now, FIG. 3 shows the lateral view of the device ready-for-operation. Here, the thicker starting zone A of the basic body (2) is solidly anchored in the screw-on zone (18) by means of the bores (7, 8)—FIG. 1—and a screw-bolt system (19), as well as by means of a clamping plate (27). On the side (back side of the depilation beater) facing the baffle stool (3; zone C), the zone (18) is fitted with an additional stop (20). On the front side (working side) of the depilation beater, the scrapers (15, 16, 17) having the form of angle pieces are arranged within the end zone B, as well as within the zone of the recess, whereby a solid anchoring is accomplished by means of the bores (9 to 14)—FIG. 1—and a rivet joint (21, 22).

Via the scrapers (15, 16, 17), the depilation beater is periodically stressed by bending (in the direction of the arrow) under the action of the force F. Such stressing varies, as a rule; however, individual jolts are so severe that the stroke of travel is limited by the stop (20). Consequently the baffle stool (3) has, in this connection, the function of a stop buffer. Now, as rubber is incompressible, the rubber layer of the baffle stool is extremely upset at the great deformations, and thereby loaded disadvantageously by high material stresses. A typical failure constellation of a depilation beater is an early tearing of the baffle stool (3) across the entire supporting cross section. At times, the baffle stool also becomes completely detached from the understructure and puckers. The range of the beginning (4) of the baffle stool is especially susceptible to wear, namely due to an abrupt change in stiffness within said zone.

Figure 4:
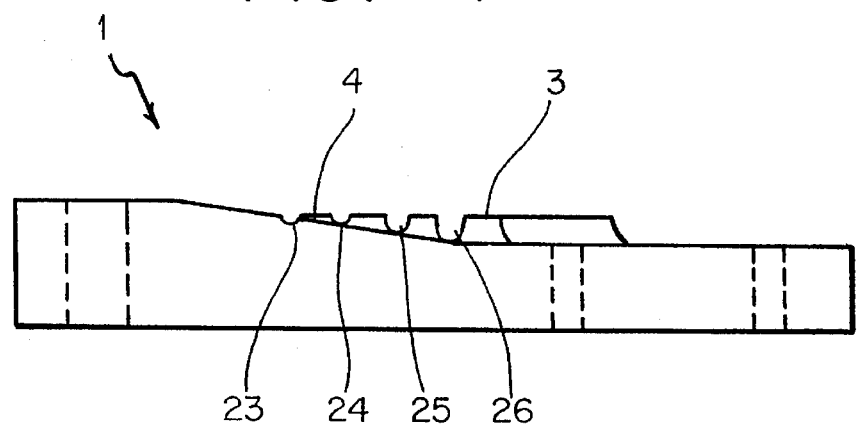
FIG. 4 shows a lateral view of the depilation beater with the fluted grooves according to the invention.

Now, FIG. 4 shows a depilation beater (1), whereby the baffle stool (3) has four fluted grooves (23, 24, 25, 26) having a varying depth and width, whereby the depth and width increase toward the end (5) of the baffle stool.

We claim:

1. Device as part of a slaughtering line, especially for slaughtering hogs, consisting of a depilation beater made of elastomeric material with preferably embedded strength carriers, said beater being a substantially rectangular basis body having a starting zone A, and end zone B, and a center zone C with said starting zone A being thicker than said end zone B; a step extending on the back side of said body within the center zone C; a baffle stool within said step and designed as one piece with the basis body; a recess formed in the distal end of the baffle stool; and which beater has bores within the zones A and B, as well as proximal to the recess;

a screw-on zone made of metal, to which the thicker zone A of the basic body is screwed, whereby the depilation beater is solidly joined by means of a first set of bores in said body having a screw-bolt system therein, as well as by a clamping plate on said screw-bolt system;

a stop, for supporting the depilation beater via the baffle stool at extreme deformation;

angle-shaped scrapers made of metal, which are arranged on the front side of the depilation beater within the zone B, as well as within the zone of the recess; means for anchoring the scrapers to the basic body comprising a second set of bores in said body having rivets therein; and at least one fluted groove extending in the transverse direction provided in the proximal end of the baffle stool.

2. Device according to claim 1, wherein the baffle stool has a plurality of fluted grooves.

3. Device according to claim 2, wherein the baffle stool has four fluted grooves.

4. Device according to claim 2, wherein the fluted grooves have a varying depth and/or width, whereby the depth and/or the width increase(s) toward the end of the baffle stool.

5. Device according to claim 2, wherein the baffle stool has two to five fluted grooves.

6. Depilation device as part of a slaughtering line, especially for slaughtering hogs, consisting of a depilation beater made of elastomeric material and having a front side or working side and a back side as well as preferably embedded strength carriers, the beater being a substantially rectangular basic body with a starting zone A, an end zone B and a center zone C, the starting zone A being thicker than the end zone B and, in addition, bores are present within zones A and B;

a screw-on zone made of metal, to which the thicker zone A of the basic body is screwed, whereby the depilation beater is solidly joined to the depilation device by means of the bores and a screw-bolt system as well as by a clamping plate;

a stop on which the depilation beater supports itself at extreme deformation; as well as of angle-shaped scrapers made of metal, which are arranged on the front side of the depilation beater within zone B, whereby a solid anchoring is accomplished by means of the bores and a rivet joint;

said depilation beater has on its backside, where there extends a gradation step, a baffle stool within the center zone C, the baffle stool being formed in one piece with the basic body, whereby in the area of an end of the baffle stool a recess is provided in whose area the depilation beater has bores;

that the depilation beater supports itself at extreme deformation on stop via the baffle stool;

that the angle-shaped scrapers are also arranged in the area of the recess; and that at least one fluted groove extending in the transverse direction is present in the area of the beginning of the baffle stool.

* * * * *